Inventor
Samuel E. Leonard Jr.
By Cushman Darby Cushman
Attorneys

Inventor
Samuel E. Leonard Jr.
By Cushman Darby & Cushman
Attorneys

June 25, 1940.  S. E. LEONARD, JR  2,205,425
APPARATUS FOR WELDING
Filed July 7, 1937   3 Sheets-Sheet 3

Inventor
Samuel E. Leonard Jr.
By Cushman Darby & Cushman
Attorneys

Patented June 25, 1940

2,205,425

UNITED STATES PATENT OFFICE 2,205,425

APPARATUS FOR WELDING

Samuel E. Leonard, Jr., Cleveland, Ohio

Application July 7, 1937, Serial No. 152,418

16 Claims. (Cl. 219—4)

The present invention relates to improvements in induction apparatus and methods of the kind disclosed in my copending application entitled Induction apparatus and methods, Serial No. 135,800, filed April 8, 1937.

Broadly considered, the present invention provides a method and apparatus for conditioning work, such as can bodies, for welding by increasing the temperature and resistivity of the work by inducing alternating currents of high frequency therein, and then welding the thus prepared work with any well-known welding means. Included in the latter are such well-known welding means as resistance welding apparatus, arc welding apparatus, spot welding apparatus and welding apparatus utilizing a direct current.

The principal object of the invention is to utilize the induction apparatus disclosed in my aforementioned application, to supplement various types of welding apparatus.

Ancillary to the above objective, it is a purpose of the present invention to utilize induction apparatus as disclosed in my said copending application, in supplementing conventional welding apparatus utilizing commercial currents, such as alternating currents having a frequency of 25 to 60 cycles per second.

Another object of the invention is to utilize the above-mentioned induction apparatus comprising a master oscillator—power amplifier combination, to supplement welding means comprising a self-oscillator circuit which may include a thermionic tube for generating alternating currents.

Another object of the invention is to provide for welding together the engaging edges of a body or bodies, which edges are not in contact with one another, by means of a conventional arc welding means, said means being supplemented by induction apparatus of the type disclosed in my aforementioned application.

A further object of the invention is to provide a welding apparatus including an induction circuit and coil which generates currents of high frequency which substantially instantaneously raises the heat of the work to a high temperature, and instantaneously increases its resistivity to a marked extent, and an auxiliary welding circuit which performs the welding operation after the temperature and resistivity of the work has thus been increased. Included in the above objective is the performance of the method of welding which includes the steps mentioned in connection with the apparatus.

Ancillary to the above objective it is a purpose of the present invention to provide control for the weld, including means which varies the intensity of the field produced by the high frequency currents in said coil, to supplement the heat produced by the auxiliary welding means to maintain a uniform weld. The invention also includes a method directed to the performance of the steps mentioned above in connection with the apparatus.

Another objective of the invention is to provide control for the welding of the engaging edges of a body or bodies, which control comprises a heat or light responsive device and a circuit therefor, the variations in the current in said circuit caused by the changes in the condition of the work being applied to the voltage or power amplifier of the induction apparatus at such point, that these current variations will be magnified in order to produce an appreciable change in the field of the coil of the induction apparatus, to compensate for fluctuations in the heat in the work incident to welding by the auxiliary welding means.

In my copending application Serial No. 135,800, I have disclosed induction apparatus and methods for use in some instances in the performance of welding. This apparatus comprises in the main, a power amplifier, or one or more voltage amplifiers and a power amplifier, for generating alternating currents of high frequency, a frequency determining oscillator coupled with said power amplifier or voltage amplifiers for imposing a desired frequency thereon, and a work application circuit including an induction coil, which circuit is coupled with said power amplifier, the coil producing a field in which the work is disposed. One of the uses of such a device is in the performance of welding, and in this use, when work such as a tubular body having engaging edges to be welded is positioned in the field of the coil with opposed points of the engaging edges in contact, a high current is caused to flow across the engaging edges of the work, resulting in a weld when pressure is applied.

This apparatus is characterized by numerous advantages, such as the maintaining of uniform frequency currents applied to the work, the substantially instantaneous heating of the work to raise its resistance as well as the substantially instantaneous setting up of a high current in the work to perform the welding. This apparatus is also characterized by the facility with which it may be controlled to maintain a uniform condition of the work, this control being effected by a light or heat responsive device which need only generate minute current changes in response to changes in the condition of the work, these changes being so applied to the power amplifier of the device that they are magnified in the form of changes in the field of the induction coil, so that the work is maintained in uniform condition. All of the characteristics and advantages of my application Serial No. 135,800 are present in the invention of the present application.

The present invention provides for the coordination with the induction apparatus disclosed in my aforementioned copending application, Serial No. 135,800 of welding devices of simple character, such as welding devices of the arc or resistance type, which may consume only relatively cheap power, such as commercial alternating current of 25 or 60 cycles.

However, it will be understood that in practicing the invention, the auxiliary welding means used in association with the induction apparatus may be of any type, and may utilize either alternating or direct current, the induction apparatus supplementing the effect of the auxiliary welding apparatus and providing such control that a uniform weld will be maintained.

It will be understood that with all forms of the invention disclosed herein, continuous welding of the seams of metal cans may be performed at high speed. Associated with the equipment disclosed may be any well-known feeding means for the work, which is operated at such speed that the work will be moved to the welding point and welded, and moved from this point and replaced by following pieces or portions of the work before any heat is wasted in heating the entire body of the work.

The drawings are illustrative of several preferred forms of the invention, and are in no sense restrictive, as the invention may be practiced with many types of circuits used for the auxiliary welding apparatus, utilizing either alternating or direct current.

Figure 1:
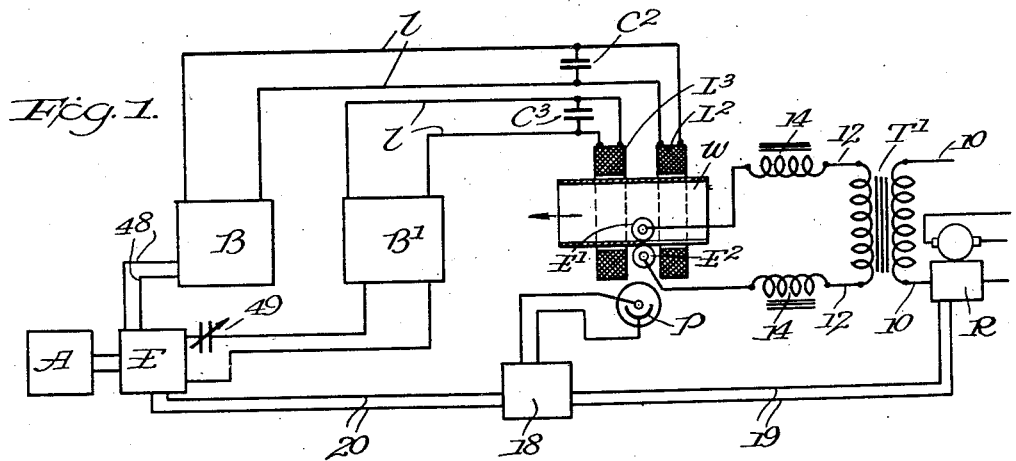
Figure 1 is a diagrammatic view of the induction apparatus disclosed in my copending application, Serial No. 135,800, having associated therewith a conventional resistance welding means.

In Figure 1, the work is shown at W, and for purposes of illustration it is shown in the form of a tubular body such as a metal can, whose side seam is to be welded. The work is shown passing in the direction of the arrow through a pair of induction coils L2 and L3, each of said coils being in a work application circuit including the respective condensers C2 and C3, each work application circuit being coupled with respective power amplifiers B and B'. The amplifiers are merely shown diagrammatically but as in my copending application, they may include a single power amplifier circuit having thermionic tube means for generating alternating currents of high frequency, or a plurality of similar voltage amplifiers coupled with a power amplifier.

Figure 2:
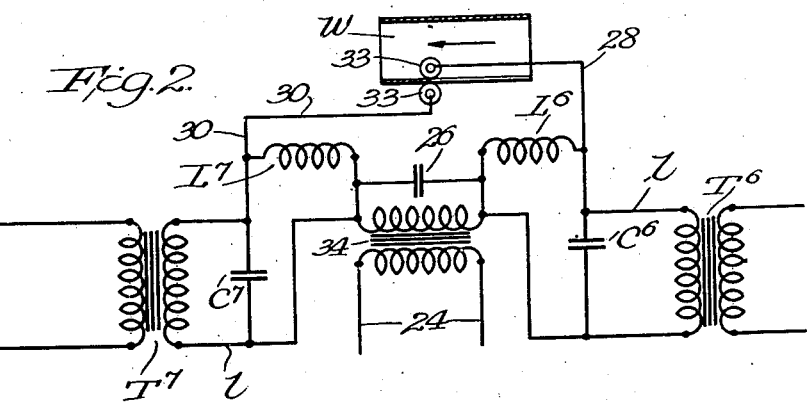
Figure 2 is a diagrammatic circuit diagram of a modified form of the invention.

Each of the amplifiers B and B' is coupled with a common stage of amplification E, shown in Figure 2 of my copending application Serial No. 135,800, the latter being coupled with a master or frequency determining oscillator A, which imposes a desired frequency on the alternating currents generated by the power amplifiers. In one of the leads which connects the stage of amplification E and the power amplifier B', is a phase changing condenser 49, which serves to maintain the frequency of the currents generated in the respective amplifiers B and B', out of phase, preferably substantially 90° out of phase.

While welding may be performed with the induction apparatus briefly described above, in some cases it may be desirable to actually perform the welding with a relatively cheap apparatus and with relatively cheap power such as alternating currents having a frequency of perhaps 25 or 60 cycles per second. Or, it may be desirable to perform the welding with direct current, using as an auxiliary to the induction apparatus, conventional direct current welding devices.

The commercial power leads are shown at 10, and through the transformer T1 they supply the power to electrodes E1 and E2 through the leads 12 which include the high frequency choke coils 14, the latter serving to isolate the commercial currents from the high frequency induced currents. The choke coils are designed to offer high impedance to the high frequency currents, maintaining the latter in the work. The electrodes E1 and E2 are shown disposed between the coils L2 and L3, at the point of maximum intensity of the combined fields of said coils. If only one coil is used, the electrodes may be conveniently disposed at the point of maximum intensity of the single coil, which would be within the opening through the same. In this case, both electrodes may be within the tubular body, one in contact with the metal thereof on each side of the seam.

The work is shown travelling from right to left in Figure 1, and the leading portion of the can is shown welded, while the portion to the right of the electrodes is approaching the welding point. As is well understood in the art, the current flowing between the electrodes encounters the high resistance of the metal at its point of contact, which results in sufficient heat to perform a weld, when pressure is applied.

Any suitable means may be provided for feeding the work through the rolls and past the electrodes, and this means may include such well-known devices as a bell mouth or concave pressure rollers for successively pressing into contact opposed points along the engaging edge of the tubular body as these points enter the area of maximum field intensity of the coils, as shown in my copending application, Serial No. 135,800.

Figure 4:
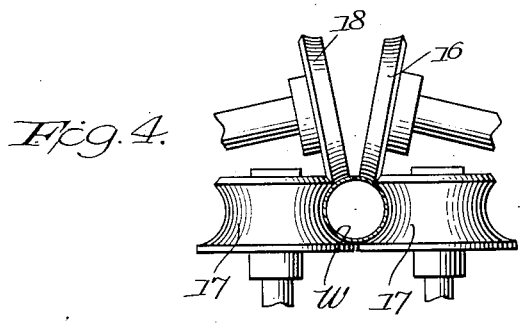
Figure 4 is a diagrammatic view of a manner in which the electrodes of resistance welding apparatus may be applied to the work.

While I have shown one electrode positioned within the can and one on the outside of the can, any suitable arrangement of the electrodes may be provided. For instance, in Figure 4 an arrangement is shown in which the electrodes 16 and 18 are arranged in contact with the work on opposite sides of its seam, so that the welding current will flow from one electrode to the other across the seam. Any conventional means may be provided with this arrangement for pressing the engaging edges of the seam together as they pass between the electrodes, or the electrodes themselves may be of such configuration and arrangement that they press the engaging edges of the work together, as is well understood in the art. Guide rollers 17 of well-known form are shown in Figure 4 for assisting in bringing the edges of the work together when opposed points thereof reach the welding area.

To control the condition of the work during welding, a light or heat responsive device P such as a photo-electric cell or a thermo-couple is disposed at any convenient point near the welding area, this device being positioned in the path of light or heat rays from the welding point, and having a circuit 18 which amplifies current changes caused by the device in response to the change in condition of the work. These amplified current changes are conveyed by means of the leads 20 to the stage of amplification E shown in detail in my aforementioned copending application, where they effect a potential change in the grids of the thermionic tubes of the amplifying stages B and B', so that the voltage supplied to the coils L2 and L3 is altered, in turn altering the field intensity of the coils to correct for excessive or deficient heat in the work.

It is a well-known fault of resistance or arc welding that defects are produced in the work at the time when the weld is being initiated. For instance, in conventional welding of the resistance type, when the welding currents are applied initially, the work is cold and its resistance consequently low, so that the current charge which travels across the seam is excessive and causes burning or pitting of the work. In this method of welding, and even after the weld is initiated, the current change resulting from heat and resistance fluctuations is so pronounced that uniform welding does not result and the non-uniformity is in many cases plainly visible.

In arc welding, it is necessary to initiate the arc by contacting the electrode with the work, and then withdrawing the electrode from the work, this operation often resulting in burning away certain areas of the work due to excessive current flow through the cold metal. The changes of heat, resistance and current in the case of arc welding are even more pronounced than in the case of resistance welding, and these uncontrolled changes tend to decrease the effectiveness and appearance of the weld.

In the present invention, the work is conveyed in any suitable manner through the induction coil or coils, and as described in my copending application, Serial No. 135,800, the currents induced in the work will be immediately raised and maintained at a substantially constant maximum value. The engaging edges of the work as they enter the field of the coil or coils will therefore be raised to a high temperature. By reason of this instantaneous action of the induction apparatus, the resistance of the work at the seam will be raised to the value it should have when welding is performed by the electrodes E1 and E2, and when the work passes between the electrodes there will be no irregularity of application of the welding currents, and a smooth and presentable weld will result.

While the intensity of the field generated by the induction coil or coils may be adjusted to be sufficient to actually weld, in practice it is desirable in this invention to regulate and maintain the fields at such intensity that they merely serve to insure a uniform heat condition during the welding, rather than actually performing the welding by induction.

During the performance of the weld there will be considerable fluctuations in the current applied by contact through the electrodes E1 and E2, and there will be a tendency for the resistance of the metal to vary by reason of these current changes, or vice versa. These changes will in turn cause heat changes, as discussed above, and this non-uniformity injures the regularity of the weld.

By means of the light or heat responsive device, such as the photo-electric cell P, any changes in the condition of the work will be immediately corrected by a change of field intensity of the induction coil or coils. That is, if due to the somewhat faulty operation of the conventional auxiliary resistance welding apparatus disclosed in this embodiment of the invention, there is a rise or fall in the temperature of the work, instead of this change tending to cause further augmented disturbance at the welding point, as is true in conventional welding, the heat change will immediately react upon the light or heat responsive device P, and through the circuit of this device and the power amplifiers of the coils, the change of the heat condition of the work will be immediately corrected by a corresponding change in the field intensity of the coil or coils. That is, if the temperature at the weld drops, instead of this drop tending to cause a further drop by its effect upon the variable factors at the weld, the field intensity of the coil or coils will immediately be correspondingly increased in order that the weld will be brought back to and maintained at the desired temperature.

The light or heat responsive device P may also be used to control the commercial power applied to the electrodes E1 and E2, by controlling the voltage applied to the primary of the transformer T1. This may be done by any well-known type of circuit, and in Figure 1 control is accomplished by means of a motor driven voltage regulator R, the regulator being operated from the circuit 18 of the light or heat responsive device P through the connecting leads 19.

Figure 3:
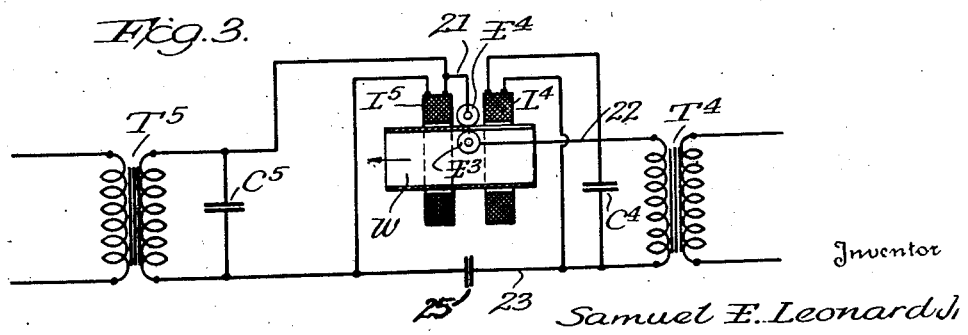
Figure 3 is a diagrammatic circuit diagram of a further modification of the invention.

In Figure 3, an arrangement is disclosed in which alternating currents of various frequencies are applied to the work, this being done by positioning the work in the fields of coils L4 and L5, said coils having separate work application circuits including the respective condensers C4 and C5; as in Figure 1, with the separate circuits connected together as shown to provide a third circuit including the electrodes E3 and E4 in contact with the work.

The coils L4 and L5 are energized preferably from their respective voltage and power amplifiers, as described in detail in my copending application, Serial No. 135,800, with currents whose frequency is controlled by separate master oscillators, one for each coil circuit. However, if it is desired, only a single master oscillator need be used for both of the coils, but if so, it is preferable to maintain the current in said coils in phase. The electrode E4 is connected with the work application circuit of the coil L5 by the lead 21, and the electrode E3 is connected with the work application circuit of the coil L4 by the lead 22. The above-mentioned work application circuits are also coupled by the lead 23, which includes the condenser 25. Thus a third oscillating circuit is provided, which includes the two work application circuits including respectively the coils L4 and L5 and the condensers C4 and C5, and connections between said circuits including lead 21, electrode E4, electrode E3 and lead 22, and lead 23 including condenser 25.

Maximum currents are induced in the work by the coils L4 and L5, which are placed in resonance with their respective master oscillators by the presence of the work in their fields. The system disclosed in this figure is particularly adapted for use in a welding method.

Currents of several different frequencies are caused to flow in the work across the weld. While the respective work application circuits containing the coils L4 and L5 may receive alternating currents of the same frequency, preferably they have separate master oscillators adjusted to impose different frequencies on these currents. For example, one work application circuit may be supplied with alternating current of frequency of 12,000 cycles per second, and the other with current of frequency of 13,000 cycles per second, and each circuit, being resonant with its master oscillator when work is present in the field of its coil, will receive only currents of frequency for which it is tuned.

The third circuit mentioned above, containing the leads 21, 22 and 23, and the electrodes E3 and E4 is untuned, and thus takes all frequency. Therefore, the above third circuit will have flowing therethrough currents of at least four different frequencies, that is, for example, currents of 12,000 and 13,000 cycles, currents of a frequency of the sum of these two frequencies, or 25,000 cycles, and currents of frequency equal to the difference of these two separate frequencies, or 1,000 cycles, as well as all of the harmonics of the above frequencies.

The work is heated in a manner discussed in connection with the embodiment of Figure 1, by induction caused by the fields of the coils L4 and L5, and is additionally heated by the third circuit having coupling currents therein. The electrodes E3 and E4 apply welding current to the work at the point where it is desired to weld, and are located in the area of maximum field intensity of the coils L4 and L5, and these electrodes being of metal, further concentrate at the fields of coils L4 and L5 at the welding point.

This system will set up a heat action in the work or can at the point where the engaging edges contact, and will produce a weld when pressure is applied. It will be understood that any conventional pressure applying devices may be used with this system, such as are disclosed in Figure 4 or in my copending application, Serial No. 135,800.

As in the principal embodiment of this invention, control means in the form of a light or heat responsive device may be positioned adjacent the work, and this control means may be connected through a suitable circuit to the power amplifiers of the respective work application circuits in order to control the intensity of the field of the coils L4 and L5. This may be done in a manner similar to that disclosed in connection with the embodiment of Figure 1.

In Figure 2, another arrangement is disclosed in which alternating currents of various frequencies are applied to the work. The principal difference of this modification of the invention over that shown in Figure 3, is that the system includes means for feeding low frequency currents to the work, such as alternating currents of perhaps 25 or 60 cycles per second. In this arrangement, the work is preheated in the manner identical with that described in connection with Figure 1, and in addition to the presence of currents of various frequencies caused by the coupling together of the work application circuits, at the welding point an additional commercial power is utilized to add to the heating effect.

In this modification, induction coils are shown at L6 and L7, and as in Figure 1, they are in such relation that their fields augment one another. The work W is diagrammatically shown in the fields of said coils. As described in my aforementioned copending application, the work application circuits containing the coils L6 and L7, and their respective condensers C6 and C7, are placed in resonance with their respective frequency determining oscillators when the work enters their fields. A single frequency determining oscillator for both work application circuits may be used, in which case it is preferred that the currents provided in the separate coils B in phase.

The work application circuits are connected by leads l with the transformers T6 and T7 of their respective power amplifiers. The coils L6 and L7 are connected to one another by a coupling condenser 26, and the opposite ends of each coil, by means of leads 28 and 30, are connected with any appropriate type of contact or arc electrodes 33, which supply the welding current to the work. These electrodes may be suitable metallic rollers in contact with the work, one electrode being inside and one outside of the work, or said electrodes may be either both inside or both outside of the work, on opposite sides of the seam thereof, and they may apply pressure to the work to assist in the effecting of the weld.

The condenser 26 is provided to lower the impedance to the high frequency currents, and eliminates the high frequency current and voltage from the secondary of the transformer 34 through which the commercial power is furnished.

The commercial power is supplied by the leads 24 which are connected with the transformer 34.

As discussed before and in connection with the arrangement disclosed in Figure 3, the system of Figure 2 is adapted for use in a welding method in which currents of several different frequencies are caused to flow in the work across the weld. The work application circuits of each of the coils L6 and L7 may be supplied with currents whose frequencies are controlled by separate master oscillators, which impose different frequencies in each coil. While the frequencies supplied to the respective coils L6 and L7 may be of the same frequency, preferably their separate master oscillators impose thereon different frequencies. Therefore, while the separate work application circuits will be tuned to receive only a single frequency the third circuit formed by said work application circuits and the leads 28 and 30 and electrodes 33, and the lead which includes the condenser 26 will have flowing therethrough currents of at least four frequencies, i. e., the currents of the frequencies supplied to the separate work application currents, and currents of the sum and difference of these frequencies, and their harmonics. In addition, as mentioned above, the lower frequency current supplied by the leads 24 will be present at the welding point.

As in the other above-described embodiments of the invention, control means in the form of a light or heat responsive device may be positioned adjacent the work, and this control means may be connected through a suitable circuit to the power amplifiers of the respective work application circuits in order to control the intensity of the fields of the coils L6 and L7. This may be done in a manner similar to that disclosed in connection with the embodiment of Figure 1.

Figure 5:
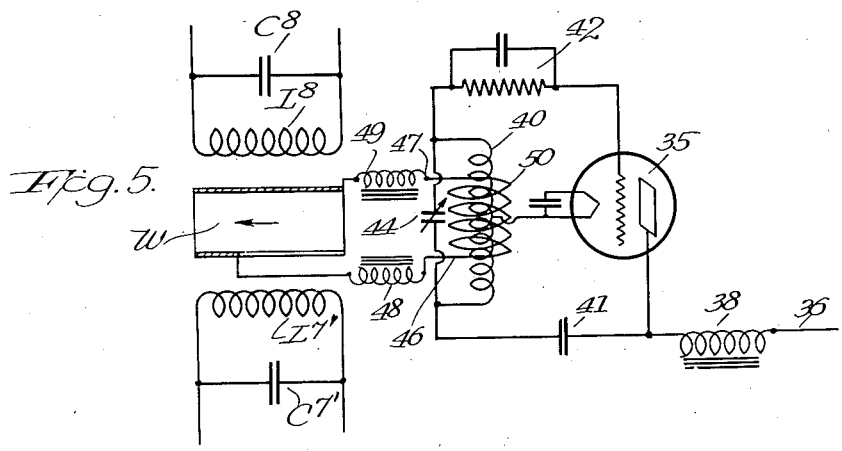
Figures 5 and 6 are circuit diagrams of further modifications of the invention.

Figure 5 shows the auxiliary welding source of power in the form of a self-oscillator. It will be understood in this arrangement, that the work application circuits contain respectively the coils L7' and L8, and their condensers C7' and C8 are connected with the stage of amplification E of Figure 1, which is controlled by the common frequency determining oscillator A. These work application circuits are so arranged that their fields augment one another, as in Figure 1 and so that when the work W is disposed in their fields, said circuits are placed in resonance with the frequency determining oscillator. As in the embodiment of Figure 1, a phase changer may be provided to place the currents and the respective coils L7' and L8 out of phase as desired. However, if desired, separate frequency determining oscillators may be provided for each of the work application circuits, and currents of different frequencies may be supplied to the respective circuits in this fashion.

The auxiliary welding circuit in the form of a self-oscillator may supply currents of any frequency to the welding point, either high or low, and the frequency of the current supplied may be as high as 100,000 cycles per second, or higher. However, the working frequencies are kept out of interfering mediums, and in the range of the most effective conditions suitable to the particular metal being worked on.

The value of using the self-oscillator as the auxiliary or welding source of power resides in its capability of providing currents variable over a wide range of frequency, to permit selection of the best frequency to be applied to the work.

The auxiliary welding circuit includes the thermionic tube 35 whose plate is connected with high voltage lead 36 through a high frequency choke 38, said plate being connected with one end of the primary 40 of a transformer through the condenser 41. The grid of tube 35 is connected with the other end of the primary 40 of the transformer through the grid leak and condenser combination 42. A variable tank condenser 44 is connected between the terminals of the primary 40 of the transformer, to vary the frequency of the currents supplied by the self-oscillator. The filament of the thermionic tube 35 is connected intermediate of the ends of the primary coil 40 of said transformer.

The leads 46 and 47 to the work are connected to opposite ends of a secondary 50 of said transformer, thus supplying high frequency current to the work in addition to that induced therein by the coils L7' and L8. Said leads may be provided with choke coils 48 and 49 which offer a high impedance to the current induced in the work by the coils L7' and L8, thereby preventing the self-oscillator from robbing energy from the work.

The leads 46 and 47 may be connected with the work in any suitable manner. That is, the lead 46 may be electrically connected with the work at a point adjacent the weld, while the lead 47 may be connected at any point of the work, such as the opposite end thereof from where the lead 46 is contacted. The auxiliary source of high frequency currents will produce resistance welding in this embodiment and the contacting means supplied by the leads 46 and 47 may be in the form of electrodes, such as roller electrodes, one outside and one inside the seam at the contact point thereof, as in Figure 1, or one of said electrodes may be contacted on one side of the seam and the other on the opposite side of said seam in the manner described in connection with Figure 4. Furthermore, the electrodes may, as previously discussed, apply pressure to the weld at the welding point. Any suitable type of electrodes may be used, such as rotary contact electrodes, or if desired, one of said electrodes may be of the arc type as previously described.

In the operation of this system, it will be seen that currents of several different frequencies will be supplied to the work; that is, coil L7' may induce current of one frequency in the work, while coil L8 may induce current therein of another frequency. Obviously, currents of the sum and difference of these frequencies will be present in the work. Furthermore, the auxiliary high frequency welding circuit including the self-oscillator may be adjusted to supply welding current of any high frequency, and as stated above, this may be current of a frequency as high as 100,000 cycles per second, or higher. As in the embodiment of Figure 1, the fields of the coils L7' and L8 may be used to prepare the work, by heating it and increasing its resistivity instantaneously, while the actual welding may be performed by the high frequency current generated by the self-oscillator.

As in the other embodiments of the invention, control of the weld may be provided by positioning a light or heat responsive device adjacent to the welding point, and connecting the circuit of said device with the power or voltage amplifiers of the respective work application circuits, as shown in Figure 1, in order to vary the intensity of the fields created by the coils L7' and L8 in accordance with the condition of the work.

Figure 6:
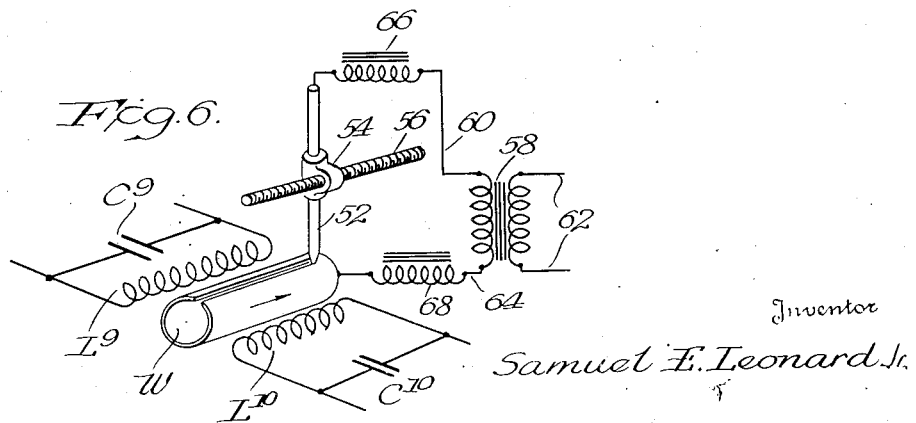

In Figure 6, the auxiliary welding system is shown in the form of an arc welding apparatus, the latter type of welding being performed on the juxtaposed edges of the work W by an arc electrode 52. This electrode is of a type which supplies metal to bridge the gap between the juxtaposed edges of the work, these edges being spaced from one another as distinguished from being in contact at one point as in the other embodiments of the present invention.

It will be understood that the work application circuits containing respectively the coils L9 and L10 and the condensers C9 and C10 are connected with the stage of amplification E of Figure 1, and that currents of the same frequency in or out of phase may be supplied to said circuits. Furthermore, if desired, these work application circuits may be connected with amplifiers controlled by separate master oscillators, in which case currents of different frequencies may be supplied to the separate work application circuits.

The welding rod 52 may be of the conventional type, and flux treated if desired as in known practice. The work is brought to a high temperature and its resistivity is increased by the fields of the coils L9 and L10 as previously described, and the welding rod 52 is fed at the point of maximum heat intensity and the arc carries across the space between the edges of the work. In other words, the high frequency induced in the work kindles the arc, and after the same is initiated, the said high frequency currents maintain the weld in uniform condition accepting the welding material from the rod 52.

The arc electrode 52 is carried by a bracket 54 and is progressively fed to the work by any suitable means, such as by a feed screw 56 rotating in the bracket 54 in contact with the electrode. The electrode is connected with the secondary of a transformer 58 by a lead 60, and said transformer is connected with any suitable source of power, such as power leads 62 which supply alternating current of commercial frequency, as, alternating current at frequency of 25 or 60 cycles per second. The opposite end of the secondary transformer 58 is connected with the work in any suitable manner as by the lead 64.

Leads 60 and 64 are provided respectively with choke coils 66 and 68, which prevent the high frequency currents induced in the work by the coils L9 and L10 from being wasted in the auxiliary welding circuit.

In this embodiment, a disturbance incident to initiating the weld with the arc electrode 52 is avoided by bringing the work to a substantial welding temperature and increased resistivity by means of the fields of coils L9 and 10, and after which the actual welding is performed by the arc electrode 52 which is supplied with alternating current of commercial frequency from the leads 62.

Furthermore, disturbances incident to the welding operation will not result in a non-uniform weld, because of current control provided by the fields of the coils L9 and L10, the intensity of which may be controlled by a light or heat responsive device positioned adjacent the welding point as previously described.

In the system of this modification, the currents induced from the work by the coils L9 and L10 cause a difference of potential between the edges of the seam, and when the arc causes a high ionized condition at the seam, the current is caused to flow across the seam gap, and the arc is kept kindled by the currents induced in the work. The work is in effect itself a transformer creating within itself high frequency currents for directing the arc applied by the auxiliary source of power.

Figure 7:
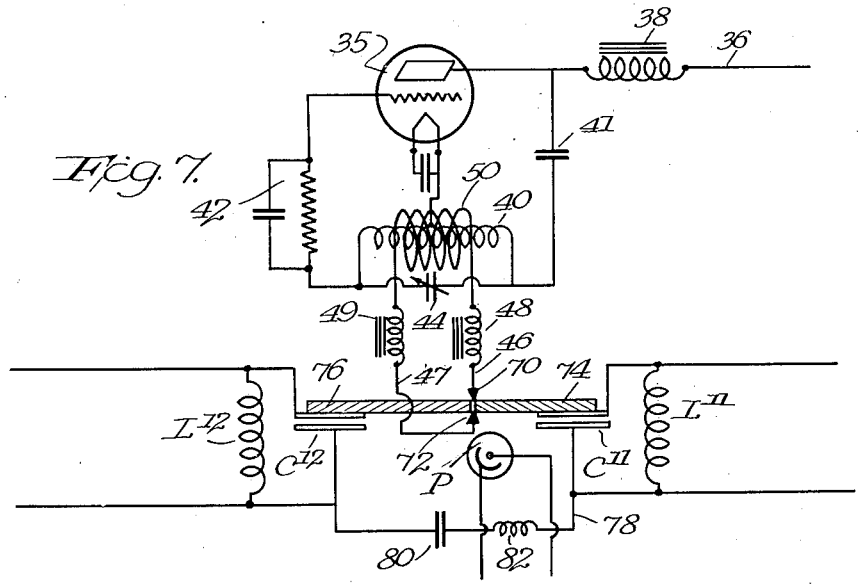
Figures 7 and 8 are circuit diagrams of further modifications of the invention.

In Figure 7, a system is disclosed wherein an auxiliary welding circuit for high frequency currents is used, the system being particularly adapted for use in welding flat work. While the auxiliary source of welding currents may include the frequency determining oscillator, power amplifier and work application circuit combination disclosed in my copending application, Serial No. 135,800, a self-oscillator may be introduced to supply currents variable over a wide range of frequency. The self-oscillator circuit of this system is identical with that disclosed in Figure 5, but the leads 46 and 47 from the transformer of said self-oscillator terminate in arc electrodes 70 and 72 respectively, which electrodes are positioned on opposite sides of the work, and in close contact therewith, to provide a relatively small but hot arc. The work is shown in the form of a pair of flat plates 74 and 76, each of which is positioned as one plate of the respective work application circuit condensers C11 and C12, said work application circuits having coils L11 and L12 in parallel with said condensers.

The work application circuits are coupled together by a lead 78, which includes a condenser 80 and an inductance coil 82, to provide most effective coupling current.

The work application circuits including the coils L11 and L12, and condensers C11 and C12 are coupled with respective power amplifiers, or voltage amplifiers and power amplifiers, the frequencies generated by which are controlled either by a common frequency determining oscillator, or a single frequency determining oscillator is provided for the separate coil circuits. If separate master or frequency determining oscillators are provided for the separate coil circuits, currents of different frequencies may be supplied thereto. It will be understood that the above work application circuits are resonant with their common or separate master oscillators.

The inductance 82 is provided to tune and couple the oscillating resonant circuits L11 and C11 and L12 and C12 to the best condition for preheating the work, and the condenser 80 is also used to give this coupling circuit the correct properties for creating heat at the point of highest resistance of the circuit, which is the point where the work is being joined in a weld.

In the present modification of the invention, the heating of the work is accomplished by the coupling current, thereby preparing the work by raising its temperature and resistivity for the application of the welding current from the auxiliary source of power, shown as the self-oscillator including the thermionic tube 35. As stated before, this auxiliary welding circuit supplies current of high frequency, variable over a wide range to suit the best welding condition. The frequency of the current supplied by the self-oscillator may be varied by means of the condenser 44, as is the case in connection with the embodiment of Figure 5.

As in the other embodiments of the invention, the condition of the weld may be controlled by means of variation of the intensity of the fields of the coils L11 and L12 by means of a heat or light responsive device P, which functions in the manner previously described in connection with the other embodiments of the invention.

As in the embodiment of Figure 5, currents of various frequencies may be imposed on the work in this embodiment of the invention. If separate master oscillators are used for the circuits of coils L11 and L12, currents of different frequencies may be supplied therethrough to the work, and in the coupling circuit there will be present currents of these different frequencies, as well as their sum and differences and harmonics. In addition, when the welding current is supplied from the circuit of the self-oscillator, current of a further different frequency will be supplied.

Figure 8:
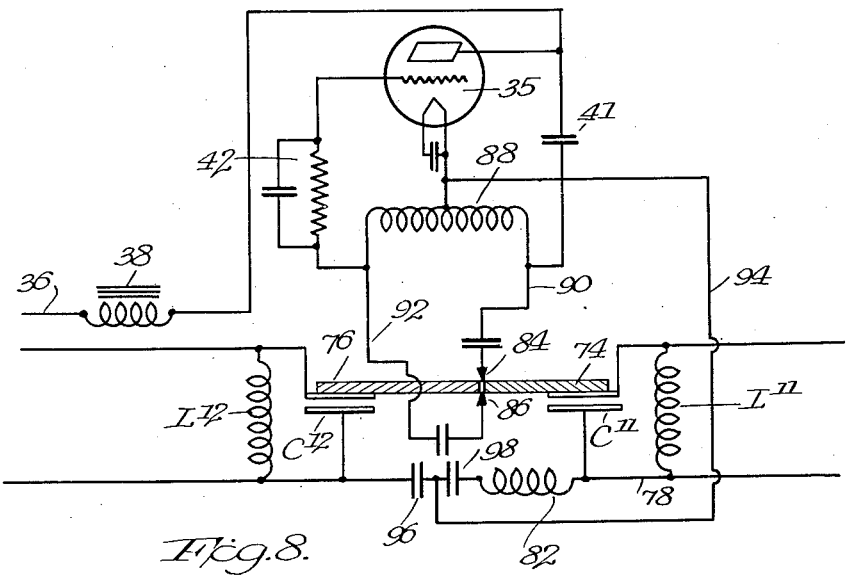

In Figure 8, a modification of the embodiment of Figure 7 is disclosed, in which the arc electrodes 84 and 86 are directly connected with a coil 88 in the self-oscillator circuit, rather than being coupled therewith through the agency of a transformer as in Figure 7. The leads 90 and 92 to the electrodes may be provided with suitable condensers, if desired. A further difference resides in the provision of a coupling lead 94, which extends from the filament of the thermionic tube 35 to a point in the connecting lead 78 between a pair of condensers 96 and 98 in said lead.

The circuits of the coils L11 and L12 are in resonance with their separate or common master oscillator, and heat is created by the coupling current to prepare the work by increase in temperature and resistivity for application of the welding current from the auxiliary welding circuit shown as that containing the self-oscillator 35.

As in the embodiment of Figure 7, the master oscillator and voltage amplifier and power amplifier combination might be used for the auxiliary source of power instead of the self-oscillator disclosed.

In this embodiment of the invention, currents of three frequencies converge at the welding point, and the auxiliary circuit containing the self-oscillator is not isolated from the circuits of the coils L11 and L12, but is coupled to it. In welding with this arrangement, the power in the form of an arc will follow the seam of the work to be welded, and the combination of currents of three fundamental frequencies and harmonics will provide heat at the welding point which is the point of highest resistivity. The arc or arcs produced by the electrodes 84 and 86 will apply heat directly to the juxtaposed edges of the work to be welded.

As in the other embodiments of the invention, a light or heat responsive device may be used to control the voltage supplied to the circuits of the coils L11 and L12, in order to control the weld.

In all of the embodiments of the present invention, the temperature of the work may be raised to a high degree by the fields of the coils in the work application circuits, after which the auxiliary welding currents produce the weld either by contact or resistance welding, or by arc welding. Furthermore, it is within the province of the invention to utilize direct current in effecting the weld. As stated before, the invention broadly resides in preparing the work for welding in the manner disclosed in the application by raising the heat and resistivity of the work, after which auxiliary welding means of any type is used to effect the weld. Furthermore, control for the heating or preparing means is provided, which will vary the heat applied by said means to suit the conditions of the work, and to maintain a uniform weld.

Furthermore, any well-known devices may be employed with the auxiliary welding means for contacting the work, such as metal electrodes and the like, and it is understood that any of the embodiments of the invention disclosed herein may employ any conventional welding means, including circuit connections and work contacts, in association therewith.

In ordinary welding operations, for instance, when using alternating current of 60 cycles, when the engaging edges of the work touch one another, the resistance is so low that a heavy current goes through the point of contact and burns or scars the seam. When the high frequency coils are used in association with the auxiliary welding equipment the molecules in the work are initially and materially affected as the work passes into the fields of the coils, and the opposite edges of the work are put in a condition wherein the potential of one edge is positive with respect to the potential of the opposite edge. When these edges are contacted at the welding point, either by mechanically joining the same under pressure, or by joining them through the intermediate agency of metal bridging the gap between the edges, as in the case of Figure 6, the molecules of the edges join together naturally without destructive sparking.

The high frequency currents induced in the work by the coils in the work application circuits produce an instantaneous high temperature in said edges, thus driving the resistance of the metal up rapidly to accommodate the high current and thus eliminate sparking. The temperature of the metal is thus changed, and its resistivity greatly increased by the high frequency currents induced therein.

No attempt has been made in the present application to disclose all of the standard means for welding which may be associated with the devices of the present invention.

Changes may be made in the apparatus and method disclosed herein without departing from the scope of the invention. Particularly, various changes may be made in the circuits disclosed while still practicing the teaching of the invention. The high frequency choke coils disclosed herein may or may not have iron cores, as desired.

It will be understood that all of the features of my copending application, Serial No. 135,800, may be included in the apparatus and methods of the present application; particularly, it will be understood that the work may place the respective work application circuits in resonance with their respective frequency determining oscillators in the case of any of the embodiments. However, some of the features of my copending application, Serial No. 135,800, need not be applied to certain of the modifications of the present application; for instance, it is not desirable that the work application circuit coils of the embodiments of Figures 2, 3, 7 and 8 should have currents supplied thereto out of phase.

I claim:

1. A welding apparatus comprising an induction circuit including an induction coil, means for generating alternating currents of high frequency and for supplying the same to said coil, said coil producing a field in which the work is disposed, said field serving to bring the work to a high temperature and increase its resistivity, auxiliary welding means for performing the welding operation after the work is prepared by the field of said coil, and automatically operable control means responsive to the heat induced in the work for varying the intensity of the field produced by said coil to supplement the heat produced by said auxiliary welding means to maintain a uniform weld.

2. In a welding apparatus of the character described, a power amplifier including a thermionic tube circuit for generating alternating currents of high frequency, a frequency determining oscillator coupled with said power amplifier through a voltage amplifier for imposing a desired frequency thereon, a work application circuit coupled with said power amplifier including a tuned coil and condenser which receives the high frequency currents from said amplifier, said coil producing a field in which the work is disposed, said field serving to bring the work to a high temperature and increase its resistivity, and auxiliary welding means for performing the welding operation after the work is prepared by the field of said coil.

3. In a welding apparatus of the character described, a power amplifier including a thermionic tube circuit for generating alternating currents of high frequency, a frequency determining oscillator coupled with said power amplifier for imposing a desired frequency thereon, a work application circuit coupled with said power amplifier including a tuned coil and condenser which receives the high frequency currents from said amplifier, said coil producing a field in which the work is disposed, said field serving to bring the work to a high temperature and increase its resistivity, auxiliary welding means for performing the welding operation after the work is prepared by the field of said coil, and automatically operable control means responsive to the condition of the work for varying the intensity of the field produced by said coil to supplement the heat produced by said auxiliary welding means to maintain a uniform weld.

4. A welding apparatus comprising an induction coil, means for generating alternating currents of high frequency and for supplying the same to said coil, said coil producing a field in which the work is disposed, said field serving to bring the work to a high temperature and increase its resistivity, an auxiliary welding means for performing the welding operation after the work is prepared by the field of said coil, comprising a welding circuit including conductor means in electrical connection with the work, and automatically operable control means responsive to the heat induced in the work for varying the intensity of the field produced by said coil to supplement the heat produced by said auxiliary welding means.

5. In an apparatus for joining by welding the engaging edges of a body or bodies, an induction coil, means for generating alternating currents of high frequency and for supplying the same to said coil, said coil producing a field in which the work is disposed, auxiliary resistance welding means comprising a welding circuit including electrodes contacting the body or bodies adjacent the engaging edges thereof, and automatically operable control means responsive to the heat induced in the work for varying the intensity of the field produced by said coil to supplement the heat produced by said auxiliary welding means to maintain a uniform weld.

6. In an apparatus for joining by welding the engaging edges of a body or bodies, an induction coil, means for generating alternating currents of high frequency and for supplying the same to said coil, said coil producing a field in which the work is disposed, auxiliary arc welding means comprising a welding circuit including an arc-electrode disposed adjacent the engaging edges of the body or bodies, and automatically operable control means responsive to the heat induced in the work for varying the intensity of the field produced by said coil.

7. In a welding apparatus of the character described, a power amplifier including a thermionic tube circuit for generating alternating currents of high frequency, a frequency determining oscillator coupled with said power amplifier for imposing a desired frequency thereon, a resonant work application circuit coupled with said power amplifier including a tuned coil and condenser which receives the high frequency currents from said amplifier, said coil producing a field in which the work is disposed, and an auxiliary self-oscillator welding means for generating alternating currents including conductor means in electrical connection with the work.

8. In a welding apparatus of the character described, a power amplifier including a thermionic tube circuit for generating alternating currents of high frequency, a frequency determining oscillator coupled with said power amplifier for imposing a desired frequency thereon, a resonant work application circuit coupled with said power amplifier including a tuned coil and associated condenser which receives the high frequency currents from said amplifier, said coil producing a field in which the work is disposed, said field serving to bring the work to a high temperature and increase its resistivity, an auxiliary self-oscillator welding means for generating alternating currents including conductor means in electrical connection with the work, and automatically operable control means responsive to the condition of the work for varying the intensity of the field produced by said coil to supplement the heat produced by said auxiliary welding means to maintain a uniform weld.

9. In an apparatus for joining by welding the engaging edges of a body or bodies, a power amplifier including a thermionic tube circuit for generating alternating currents of high frequency, a frequency determining oscillator coupled with said power amplifier for imposing a desired frequency thereon, a resonant work application circuit coupled with said power amplifier including a tuned coil and condenser which receives the high frequency currents fom said power amplifier, said coil producing a field in which the work is disposed, said field serving to bring the work to a high temperature and increase its resistivity, and auxiliary welding means for performing the welding operation after the work is prepared by the field of said coil comprising a welding circuit including conductor means in electrical connection with the work.

10. In an apparatus for joining by welding the engaging edges of a body or bodies, a power amplifier including a thermionic tube circuit for generating alternating currents of high frequency, a frequency determining oscillator coupled with said power amplifier for imposing a desired frequency thereon, a work application circuit coupled with said power amplifier including a tuned coil and associated condenser which receives the high frequency currents from said power amplifier, said coil producing a field in which the work is disposed, said field serving to bring the work to a high temperature and increase its resistivity, an auxiliary welding means for performing the welding operation after the work is prepared by the field of said coil, comprising a welding circuit including conductor means in electrical connection with the work, and automatically operable control means responsive to the condition of the work for varying the intensity of the field produced by said coil to supplement the heat produced by said auxiliary welding means to maintain a uniform weld.

11. In an apparatus for joining by welding the engaging edges of a body or bodies, a power amplifier including a thermionic tube circuit for generating alternating currents of high frequency, a frequency determining oscillator coupled with said power amplifier for imposing a desired frequency thereon, a resonant work application circuit coupled with said power amplifier including a tuned coil and condenser which receives the high frequency currents from said power amplifier, said coil producing a field in which the work is disposed, said field serving to bring the work to a high temperature and increase its resistivity, and an auxiliary welding means for performing the welding operation after the work is prepared by the field of said coil, comprising a welding circuit including an arc electrode disposed adjacent the engaging edges of the body or bodies.

12. An apparatus for joining by welding work of known characteristics, a pair of induction coils, means including a circuit for each of said coils for passing alternating currents of different frequencies therethrough, each of said circuits including a frequency determining oscillator and a work application circuit in which the coil is disposed, said coils being located adjacent one another so that their fields caused by said alternating currents augment one another, means for supporting the work in the fields of said coils, each work application circuit and frequency determining oscillator being so tuned that the former is placed in resonance with the latter when the work of known characteristics is placed in the fields of said coils, and a circuit including electrical connections to the work coupled with the circuits of said coils, said last-named circuit being untuned, whereby it receives the alternating currents of different frequencies from the circuit of said coils.

13. An apparatus for welding work of known characteristics, a pair of induction coils, means including a circuit for each of said coils for passing alternating currents of different frequencies therethrough, each of said circuits including a frequency determining oscillator and work application circuit in which the coil is disposed, said coils being located adjacent one another so that their fields caused by said alternating currents augment one another, means for supporting the work in the fields of said coils, each work application circuit and frequency determining oscillator being so tuned that the former is placed in resonance with the latter when the work of known characteristics is placed in the fields of said coils, a circuit including electrical connections to the work coupled with the circuits of said coils, said last named circuit being untuned whereby it receives the alternating currents of different frequencies from the circuits of said coils, and means for supplying alternating currents of commercial frequency to said last named untuned circuit.

14. In a welding apparatus, a pair of induction coils, means including a circuit for each of said coils for passing alternating currents of different frequencies therethrough, and a third circuit including electrical connections to the work coupled with the circuits of said coils, said third circuit receiving the alternating currents of different frequencies from the circuits of said coils.

15. In a welding apparatus, a pair of induction coils, means including a circuit for each of said coils for passing alternating currents of different frequencies therethrough, each of said circuits including a frequency determining oscillator and a work application circuit in which the coil is disposed, a circuit including electrical connections to the work coupled with the circuits of said coils, said last-named circuit being untuned whereby it receives the alternating currents of different frequencies from the circuits of said coils, and auxiliary welding means for performing the welding operation after the work is prepared by said last-named circuit.

16. In a welding apparatus, a pair of induction coils, means including a circuit for each of said coils for passing alternating currents of different frequencies therethrough, each of said circuits including a frequency determining oscillator and a work application circuit in which the coil is disposed, a circuit including electrical connections to the work coupled with the circuits of said coils, said last-named circuit being untuned whereby it receives the alternating currents of different frequencies from the circuits of said coils, and auxiliary welding means for performing the welding operation after the work is prepared by said last-named circuit including a circuit coupled to said last-named circuit.

SAMUEL E. LEONARD, JR.